US012188642B2

(12) United States Patent
Zhang et al.

(10) Patent No.: US 12,188,642 B2
(45) Date of Patent: Jan. 7, 2025

(54) MODULE FOR MOUNTING TO A LUMINAIRE

(71) Applicant: SIGNIFY HOLDING B.V., Eindhoven (NL)

(72) Inventors: Zhangjia Zhang, Shanghai (CN); Christofher Daniel Charles Hooijer, Helmond (NL); Zhipei Wang, Shanghai (CN); Huan Zhang, Shanghai (CN)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/288,246

(22) PCT Filed: May 17, 2022

(86) PCT No.: PCT/EP2022/063331
§ 371 (c)(1),
(2) Date: Oct. 25, 2023

(87) PCT Pub. No.: WO2022/243321
PCT Pub. Date: Nov. 24, 2022

(65) Prior Publication Data

US 2024/0210020 A1 Jun. 27, 2024

(30) Foreign Application Priority Data

May 18, 2021 (WO) ................ PCT/CN2021/094265
Sep. 7, 2021 (EP) .................................... 21195191

(51) Int. Cl.
*F21S 8/08* (2006.01)
*F21V 21/30* (2006.01)
(Continued)

(52) U.S. Cl.
CPC .............. *F21V 21/30* (2013.01); *F21S 8/086* (2013.01); *F21V 23/0442* (2013.01);
(Continued)

(58) Field of Classification Search
CPC .......... F21S 8/085; F21S 28/086; F21S 8/088; F21V 23/06; F21V 23/0471; F21V 23/0442; F21W 2131/105
See application file for complete search history.

(56) References Cited

U.S. PATENT DOCUMENTS 9,347,822 B2 * 5/2016 Mostoller .............. H05B 47/11
10,330,301 B1 6/2019 Howard et al.
(Continued)

*Primary Examiner* — William N Harris

(57) ABSTRACT

A module (10) adapted for fitting to a luminaire (100), comprising: a main module housing (50); a rotate plate (60) coupled to the main module housing, and rotatable relative to the main module housing; a connection interface (70) for connecting the module to a corresponding connection interface of the luminaire, wherein the connection interface (70) is connected to the rotate plate; and a rotatable electrical connection (80) between the rotate plate and the main module housing, wherein the rotate plate (60) comprises a locking feature (62) which engages with a retaining feature (52) of the main module housing to lock the rotate plate with a selected relative rotational position between the rotate plate and the main module housing, wherein the locking feature (62) is provided on an elastically deformable region (64) of the rotate plate such that the locking feature can be brought out of engagement from the retaining feature by manual deformation of the deformable region (64) thereby to enable selection of the relative rotational position.

15 Claims, 9 Drawing Sheets

(51) Int. Cl.
*F21V 23/04* (2006.01)
*F21V 23/06* (2006.01)
*F21W 131/103* (2006.01)

(52) U.S. Cl.
CPC .......... *F21V 23/0471* (2013.01); *F21V 23/06* (2013.01); *F21W 2131/103* (2013.01)

(56) References Cited

U.S. PATENT DOCUMENTS

| | | | | |
|---|---|---|---|---|
| 11,187,404 | B2 * | 11/2021 | Howard | H01R 33/965 |
| 11,482,817 | B2 * | 10/2022 | Mostoller | H01R 13/213 |
| 2013/0279172 | A1 * | 10/2013 | Wang | F21V 29/74<br>362/373 |
| 2015/0260377 | A1 | 9/2015 | Hobson | |
| 2016/0061428 | A1 * | 3/2016 | Nimma | F21V 31/005<br>362/235 |
| 2016/0103016 | A1 | 4/2016 | Weber | |
| 2018/0092186 | A1 | 3/2018 | Stuby, Jr. | |
| 2018/0195899 | A1 | 7/2018 | Howard | |
| 2019/0162400 | A1 * | 5/2019 | Mostoller | F21V 23/0464 |

* cited by examiner

MODULE FOR MOUNTING TO A LUMINAIRE

CROSS-REFERENCE TO PRIOR APPLICATIONS

This application is the U.S. National Phase application under 35 U.S.C. § 371 of International Application No. PCT/EP2022/063331, filed on May 17, 2022, which claims the benefit of International Application Serial No. PCT/CN2021/094265, filed on May 18, 2021, and European Patent Application No. 21195191.8, filed on Sep. 7, 2021. These applications are hereby incorporated by reference herein.

FIELD OF THE INVENTION

This invention relates to a module, such as a sensor arrangement or a communications interface, for mounting to luminaire. For example, the invention relates to a module for providing sensor data or control signals for controlling a street light luminaire.

BACKGROUND OF THE INVENTION

It is known to fit a luminaire with a module for providing sensor inputs or to enable communication with a network. There are for example existing socket designs which are applied to a luminaire housing to enable connection in a watertight manner of an external module. An example is the standardized interface of components to LED luminaires provided by Zhaga.

For street lighting, the socket to which the module is to be attached is for example mounted in a horizontal plane. In some cases, it is desirable to be able to select a rotational orientation of the module about the vertical axis. For example, the module may need to face towards another module for communication between the modules, or the module may have a desired direction for sensing e.g. traffic on a road or pedestrians on a sidewalk. A microwave motion sensor is for example used for this purpose.

By rotating the module, the field of view of a sensor or communications module may thereby be adjusted. For example a detection range may be adjusted. However, the standard socket is not designed to allow coupling of a module in any desired orientation.

It would be desirable to have a module design which allows adjustment of the angular position of a main body of the module relative to the luminaire socket. Furthermore, it would be desirable for this to be achieved in a simple manner, for example without the need for tools.

SUMMARY OF THE INVENTION

The invention is defined by the claims.

According to examples in accordance with an aspect of the invention, there is provided a module adapted for fitting to a luminaire, comprising:

- a main module housing;
- a rotate plate coupled to the main module housing, and rotatable relative to the main module housing;
- a connection interface for connecting the module to a corresponding connection interface of the luminaire, wherein the connection interface is connected to the rotate plate; and
- a rotatable electrical connection between the rotate plate and the main module housing, wherein the rotate plate comprises a locking feature which engages with a retaining feature of the main module housing to lock the rotate plate with a selected relative rotational position between the rotate plate and the main module housing, wherein the locking feature is provided on an elastically deformable region of the rotate plate such that the locking feature can be brought out of engagement from the retaining feature by manual deformation of the deformable region thereby to enable selection of the relative rotational position.

This module is rotationally adjustable by deforming the deformable region to allow rotation between the rotate plate and the main module housing. The deformation and rotation can be performed by hand so not requiring any tools. This is a particular advantage for example when fitting a module to a luminaire in a dangerous location, for example high up in the case of a street light. The selected rotational position is locked when the deformable region returns to its default position by the elasticity of the rotate plate.

The locking feature is preferably an integral part of the rotate plate.

The rotate plate may comprise a disc having an arc slot and the main module housing comprises a marker pin which projects into the arc slot to indicate the selected relative rotational position.

Thus, feedback is provided during adjustment.

The engagement between the arc slot and the marker pin may also define the limits of the relative rotational position.

The deformable region is for example a region of the rotate plate which is located radially outside the arc slot. This is for example an arc of material outside the slot, which is thin enough (in the radial direction) to be deformable but also sufficiently strong to withstand the deformation and to return elastically to a locked position.

The region of the rotate plate may comprise a set of openings along a circumferential direction, each opening representing a particular relative rotational position.

The openings may provide an additional visible indicator. For example, a colored indicated may be visible through one of the openings, thereby indicating the selected rotational position.

The locking feature is for example located at a position of the deformable region corresponding to a middle of the arc slot along a circumferential direction. This is the most easily deformed area.

The rotate plate may comprise a finger tab at the location of the locking feature. This guides the user as to the location of the deformable region. The user for example pushes on the finger tab and then rotates the rotate plate.

The locking feature for example comprises a projection extending from the rotate plate and the retaining feature comprises a plurality of receiving elements, wherein the projection can be received in a selected one of the receiving elements to lock the rotate plate to the main module housing. This provides a set of possible rotational positions. The receiving elements are for example the gaps between spaced teeth (such as cog teeth), grooves, recesses, channels, or indeed any feature which can engage with the projection.

The main module housing for example comprises a base plate and a component chamber, wherein a seal is provided between the base plate and the rotate plate. The seal prevents fluid ingress while allowing the relative rotation between the two parts.

The rotatable electrical connection for example comprises a conductor track plate rotationally fixed to one of the rotate plate and the main module housing, and a spring contact plate rotationally fixed to the other of the rotate plate and the main module housing. The conductor track plate and the spring contact plate thus rotate relative to each other.

The track plate may comprise a set of arcuate conductor tracks and the spring contact plate comprises a corresponding set of spring contacts each for contacting a respective one of the arcuate conductor tracks. There are for example three or four tracks and contacts.

The module may comprise a wireless communications module in the main module housing. The module thus enables the luminaire to be connected to a network by wireless communication, e.g. between adjacent luminaires which are within the network.

The module may instead or as well comprise a presence sensor in the main module housing. The module then enables automated lighting control based on presence detection.

The invention also provides a luminaire comprising:

a luminaire housing, comprising a connection interface for connection to a module; and the module as defined above connected to the connection interface of the luminaire housing.

The luminaire for example comprises a street light luminaire.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
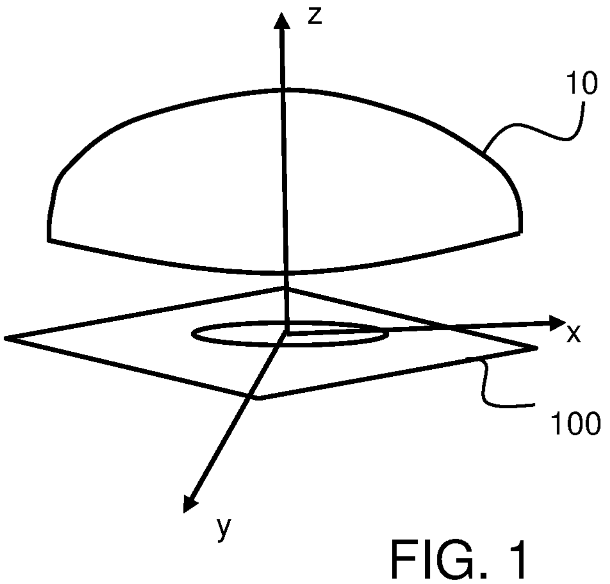
FIG. 1 shows a module for connection to a luminaire.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a module for fitting to a luminaire. It has a main module housing and a rotate plate rotatable relative to the main module housing with a rotatable electrical connection between them. The rotate plate connects to the luminaire. It has a locking feature which engages with a retaining feature of the main module housing to lock the rotate plate with a selected relative rotational position. The locking feature is formed on an elastically deformable support so that it can be brought out of engagement from the retaining feature by manual deformation with no tools.

FIG. 1 shows a module 10 to be mounted to a luminaire 100 (only a portion of an external surface of the luminaire is shown in FIG. 1). It is known that it is desirable for the module to be rotatable so that a field of view of the module can be selected. This may be a field of view of a sensor, for example a microwave sensor for pedestrian and/or traffic sensing, or a communications module for communicating with another module.

FIG. 1 shows that the module has an x-axis and a y-axis to be in a horizontal plane and a z-axis to be vertical, when the module is installed.

Figure 2:
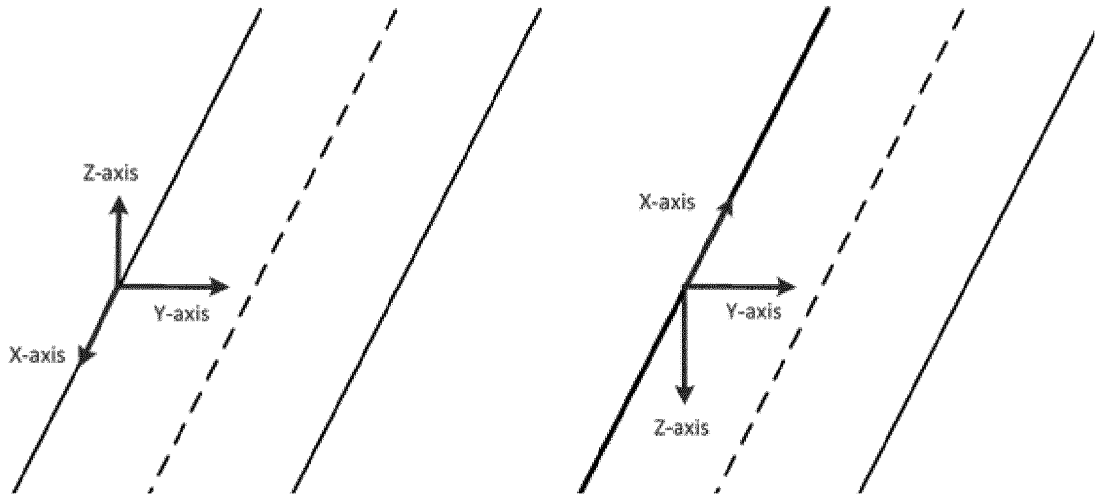
FIG. 2 shows that for a street lighting application, it is recommended that the module is mounted with a particular orientation to the road.

FIG. 2 shows that for a street lighting application, it is recommended that the module is mounted such that the y-axis is perpendicular to length axis of the road and is pointing towards the center of the road. However, the z-axis may be upward or downward facing, as shown, depending on the luminaire design, with sensors mounted on the top side or the bottom side of the luminaire respectively.

A sensor mounted on the bottom side (facing downwardly) is for example a motion sensor, to be aligned towards the road. A sensor mounted on the top side (facing upwardly and hence with the orientation shown in FIG. 1) is for example a light sensor, and the performance of the light sensor may depend on the orientation.

It is thus desirable to mount the module with a correct rotational orientation around the vertical z-axis. This may not correspond to the orientation of a socket on the luminaire, e.g. the orientation of a Zhaga socket. Thus, it is desirable that the module can support onsite rotational adjustment.

Figure 3:
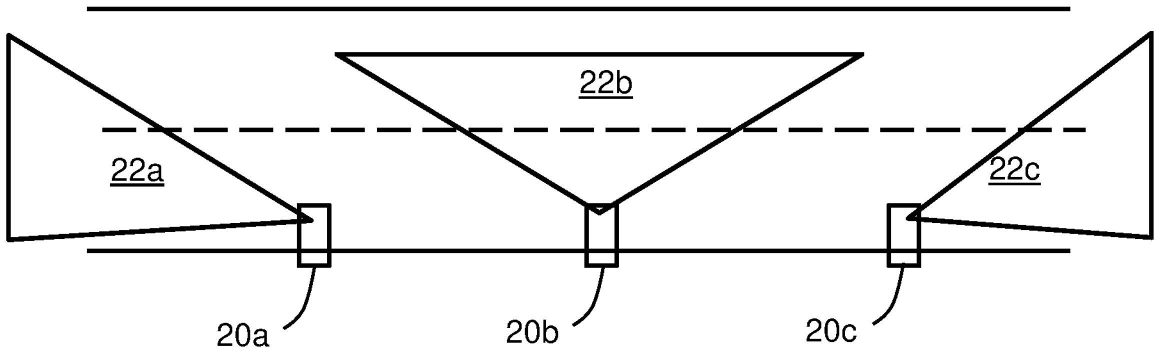
FIG. 3 shows three street lights over a road with different rotational orientations of the modules.

FIG. 3 shows three street lights 20*a*, 20*b*, 20*c* over a road with different rotational orientations of the fields of view 22*a*, 22*b*, 22*c* of integrated sensor modules. This enables the coverage of the sensors to extend to the whole street.

Figure 4:
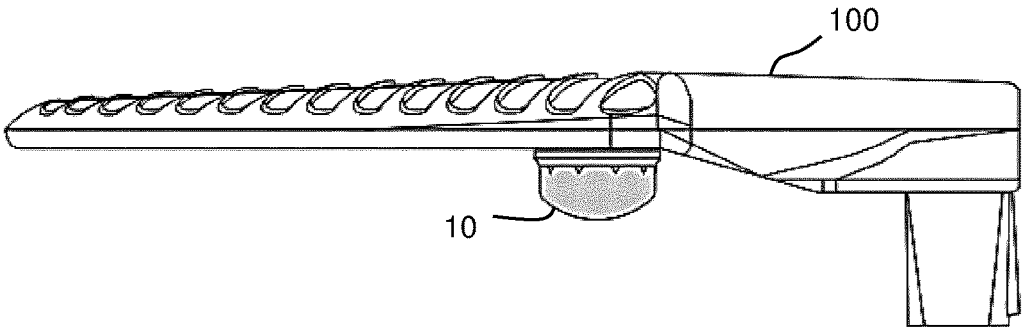
FIG. 4 shows a luminaire in the form of a street light with a module having its z-axis facing downwardly.

FIG. 4 shows a luminaire 100 in the form of a street light with a module 10 having its z-axis facing downwardly.

Figure 5:
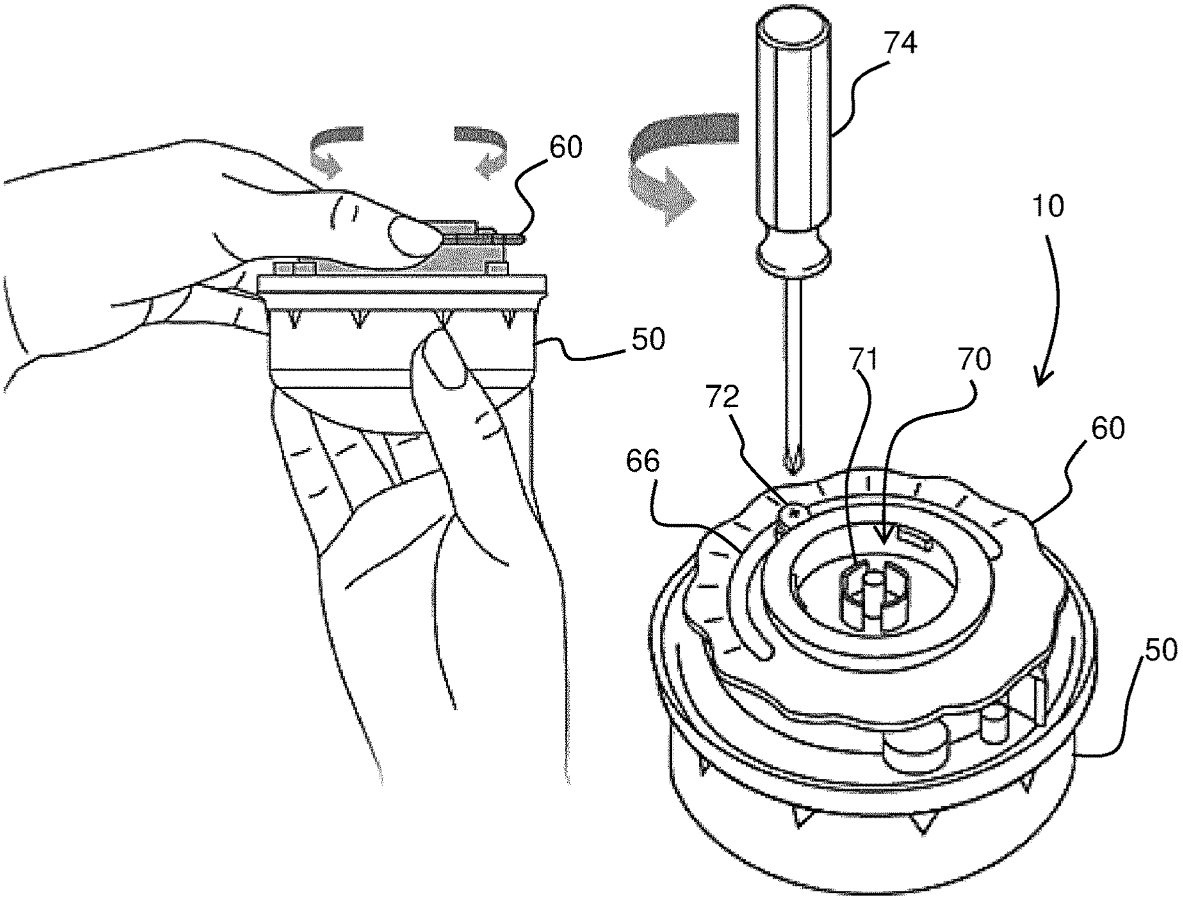
FIG. 5 shows a first design of the module to enable rotational adjustment of the module relative to part which fixes to the luminaire.

FIG. 5 shows a first design of the module 10 to enable rotational adjustment of the module relative to part which fixes to the luminaire. This first design has been considered by the inventors, but the invention relates to an improvement described further below.

In the example of FIG. 5, the module comprises a main module housing 50 and a rotate plate 60 coupled to the main module housing, and rotatable relative to the main module housing.

The main module housing 50 contains electrical circuitry. The electrical circuitry may comprise a wireless communications module to enable the luminaire to be connected to a network by wireless communication, e.g. between adjacent luminaires which are within the network. It may additionally or alternatively include a presence sensor such as a microwave sensor for automated lighting control based on presence detection.

A connection interface 70 is provided for connecting the module to a corresponding connection interface of a luminaire. The connection interface 70 is fixedly connected to the rotate plate 60.

The Zhaga socket connection interface allows connection to a corresponding connection interface of the luminaire with only one possible angular orientation. Thus, there is one possible orientation for a top mounted device (as shown in the left part of FIG. 2) and one possible orientation for a bottom mounted device (as shown in the right part of FIG. 2).

The connection interface comprises a set of electrical connections, such as a set of four pins 71 of the connection interface 70 and four slots of the corresponding connection interface of a luminaire.

A rotatable electrical connection is provided between the rotate plate 60 and the main module housing 70 so that electrical connection is made regardless of the rotational orientation.

By making a rotational adjustment as shown in the left image of FIG. 5, the rotational orientation of the main module housing relative to the luminaire can be adjusted while retaining an electrical connection to the components in the module housing.

In the example of FIG. 5, a locking screw 72 slides in a slot 66 of the rotate plate 60 during rotational adjustment. By tightening the locking screw 72, the rotational position can be fixed. However, this requires use of a tool, namely the screwdriver 74 as shown in the right image of FIG. 5.

Figure 6:
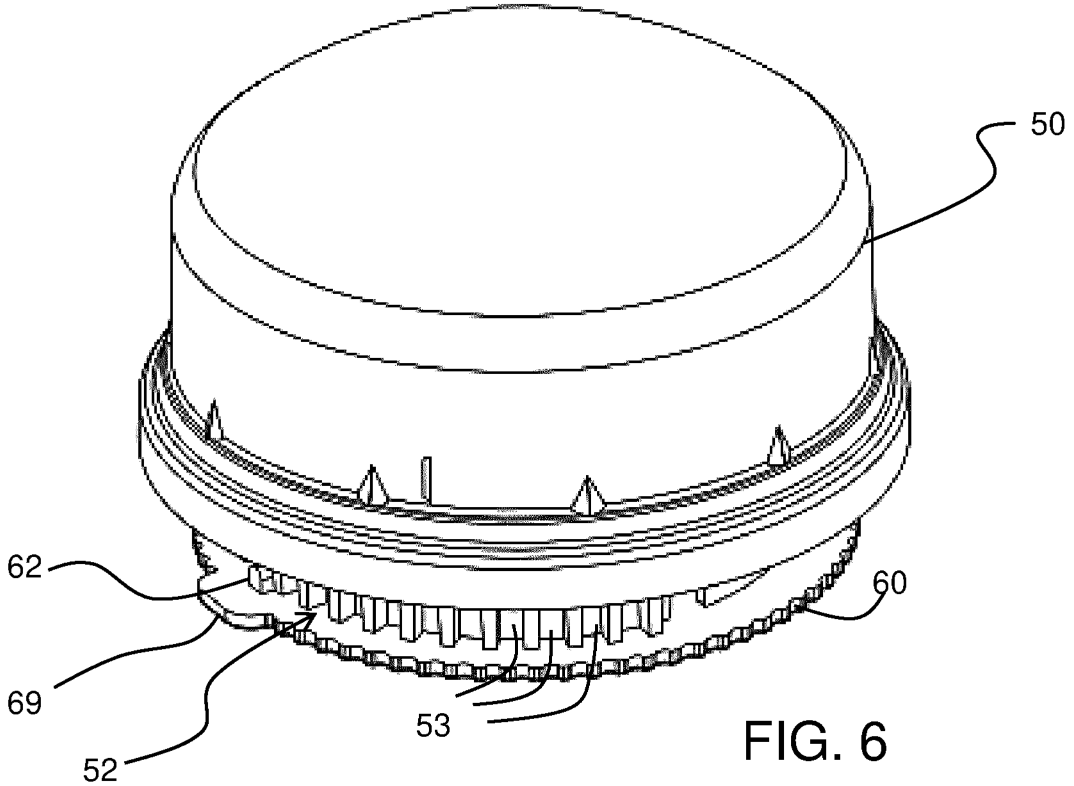
FIG. 6 an improved module design from above.
Figure 7:
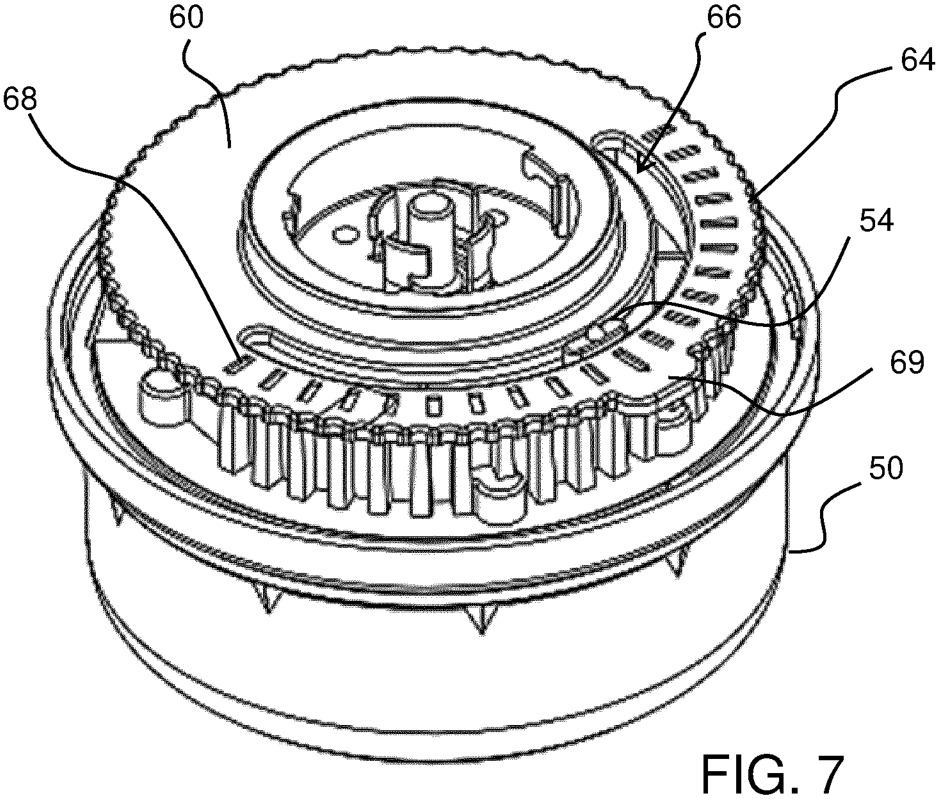
FIG. 7 shows the improved module design of FIG. 6 from below.

The invention provides an improved design compared to FIG. 5, as shown most clearly in FIGS. 6 and 7. FIG. 6 shows the module from above and FIG. 7 shows the module from below.

Instead of a separate locking screw, the rotate plate 60 comprises an integrated locking feature 62 which engages with a retaining feature 52 of the main module housing 50 to lock the rotate plate 60 with a selected relative rotational position between the rotate plate 60 and the main module housing 50. The rotate plate has a ridged outer rim to enable easy gripping by a user.

The locking feature 62 in this example comprises a projection which is provided on an elastically deformable region 64 of the rotate plate 60. It extends from the rotate plate 60 towards the main module housing in the z-axis direction. Thus, the locking feature 62 can be brought out of engagement from the retaining feature 52 by manual deformation of the deformable region 64 thereby to enable selection of the relative rotational position.

As in the example above, the rotate plate 60 comprises a disc having an arc slot 66 and the main module housing comprises a marker pin 54 which projects into the arc slot 66 to indicate the selected relative rotational position. The engagement between the arc slot 66 and the marker pin 54 defines the limits of the relative rotational position.

In this example, a range of adjustment of around 180 degrees is enabled by a slot with angular length of around 180 degrees. With two possible connection orientations of the rotate plate to the luminaire, this gives full 360 degree adjustability.

The deformable region 64 is a region of the rotate plate 60 which is located radially outside the arc slot 66. This is a relatively thin strip of material, thus having inherently greater deformability than the rest of the disc, without needing to be formed of a different material. The deformability is greatest at a middle position along the strip (adjacent a middle of the arc slot 66 along a circumferential direction). Thus, the locking feature 62 is at this position, and the rotate plate 60 comprises a finger tab 69 at the location of the locking feature 62 to guide the user as to the location of the deformable region and to assist in implementing the desired deformation. The user for example pushes on the finger tab 69 and then rotates the rotate plate while holding the main module housing still (in the other hand).

The module is in this way rotationally adjustable by deforming the deformable region 64 to allow rotation between the rotate plate 60 and the main module housing 50. The deformation and rotation can be performed by hand so not requiring any tools. The selected rotational position is locked when the deformable region returns to its default position by the inherent elasticity of the rotate plate.

The deformable region 64 for example has a set of openings 68 along a circumferential direction, each opening representing a particular relative rotational position. By way of example, one opening (e.g. next to the tab 69) may reveal a colored, e.g. red, area so that the rotational setting can be easily seen. An angle indicator (e.g. a number of degrees) may be provided for each opening. The openings also allow the deformability and elasticity of the deformable region to be set by design, to give the desired material properties for the deformation and elastic return of the deformable region, i.e. the unlocking and locking of the rotational adjustment.

The retaining feature 52 comprises a plurality of receiving elements 53. The locking feature projection can be received in a selected one of the receiving elements to lock the rotate plate 60 to the main module housing.

The receiving elements in this example comprise slots between a set of teeth, so that the projection is clamped in a slot between a pair of teeth. Any suitable receiving elements may be used such as grooves or recesses.

Figure 8:
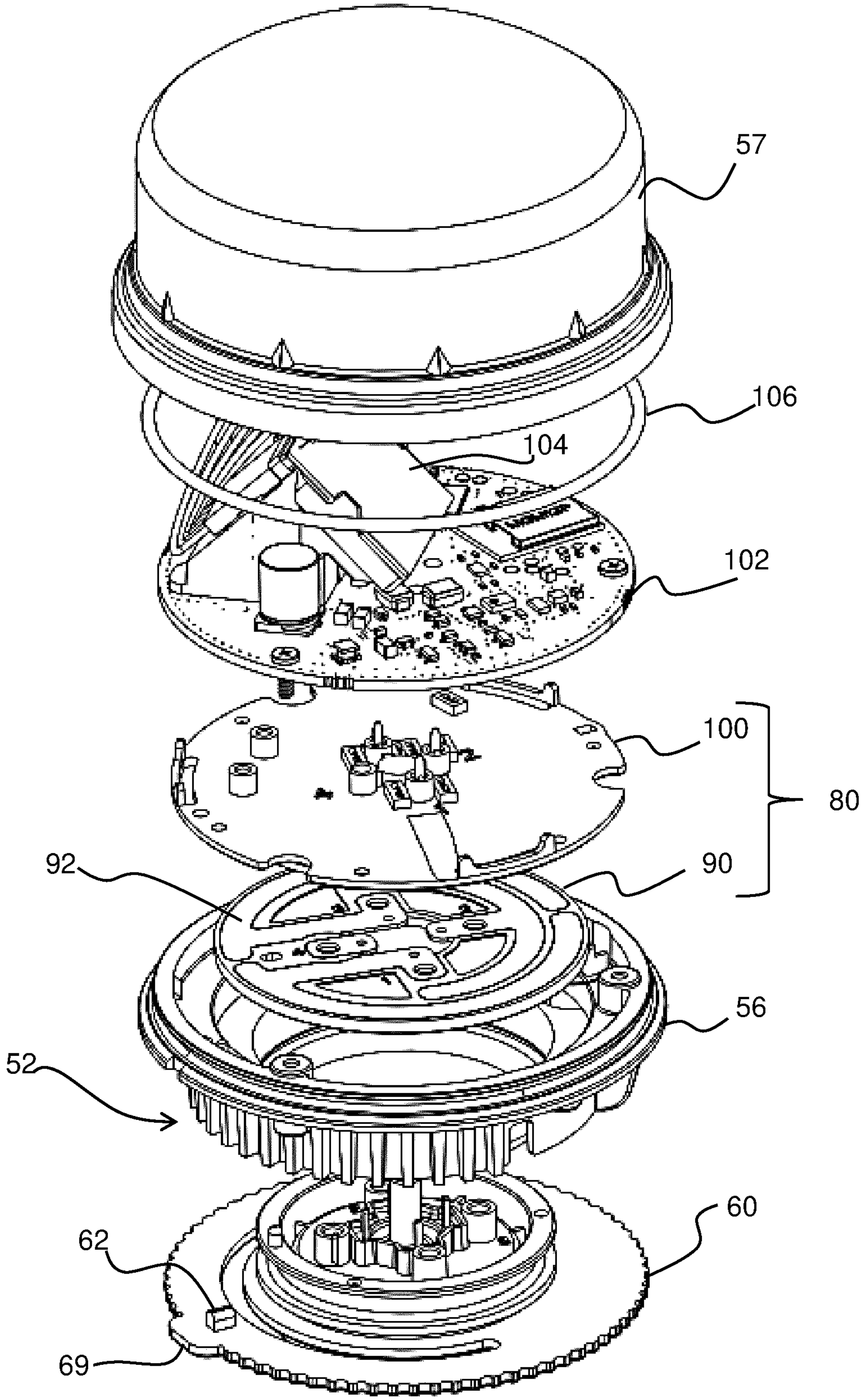
FIG. 8 shows an exploded view of the module.

FIG. 8 shows an exploded view of the module. It shows that the main module housing is made up of a base plate 56 and a cover 57 which defines a component chamber.

The rotatable electrical connection 80 is also shown. It comprises a conductor track plate 90 rotationally fixed to one of the rotate plate 60 and the main module housing, and a spring contact plate 100 rotationally fixed to the other of the rotate plate and the main module housing.

In the example shown, the conductor track plate is connected to the rotate plate 60 and the spring contact plate 100 is connected to the main module housing, in particular to the cover 57. The conductor track plate and the spring contact plate thus rotate relative to each other during adjustment.

The conductor track plate 90 comprises a set of arcuate conductor tracks 92 and the spring contact plate 100 comprises a corresponding set of spring contacts (not seen in FIG. 8 because they are at the underside of the spring contact plate 100) each for contacting a respective one of the arcuate conductor tracks.

The spring contact plate 100 connects to a printed circuit board 102 which carries the electrical components of the module, such as a signal reflector 104. The angular orientation of the signal reflector determines orientation of the field of view of the sensor or communications equipment of the module.

A seal 106 couples the two parts 56, 57 of the main module housing.

Figure 9:
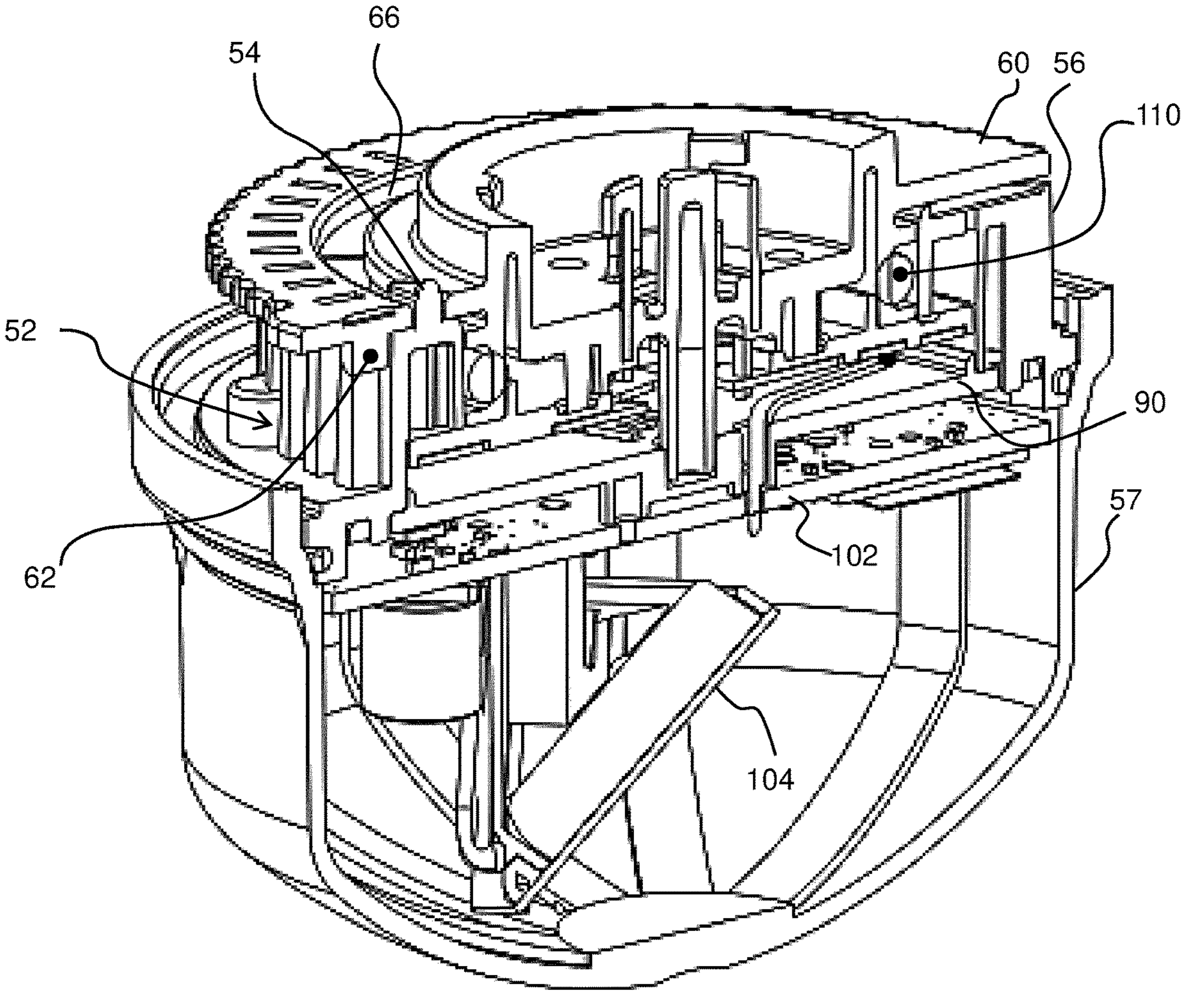
FIG. 9 shows the assembled module in cross section.

FIG. 9 shows the assembled module in cross section. It shows that a seal 110 is provided between the base plate 56 and the rotate plate 60 to prevent fluid ingress while allowing the relative rotation between the two parts.

Figure 10:
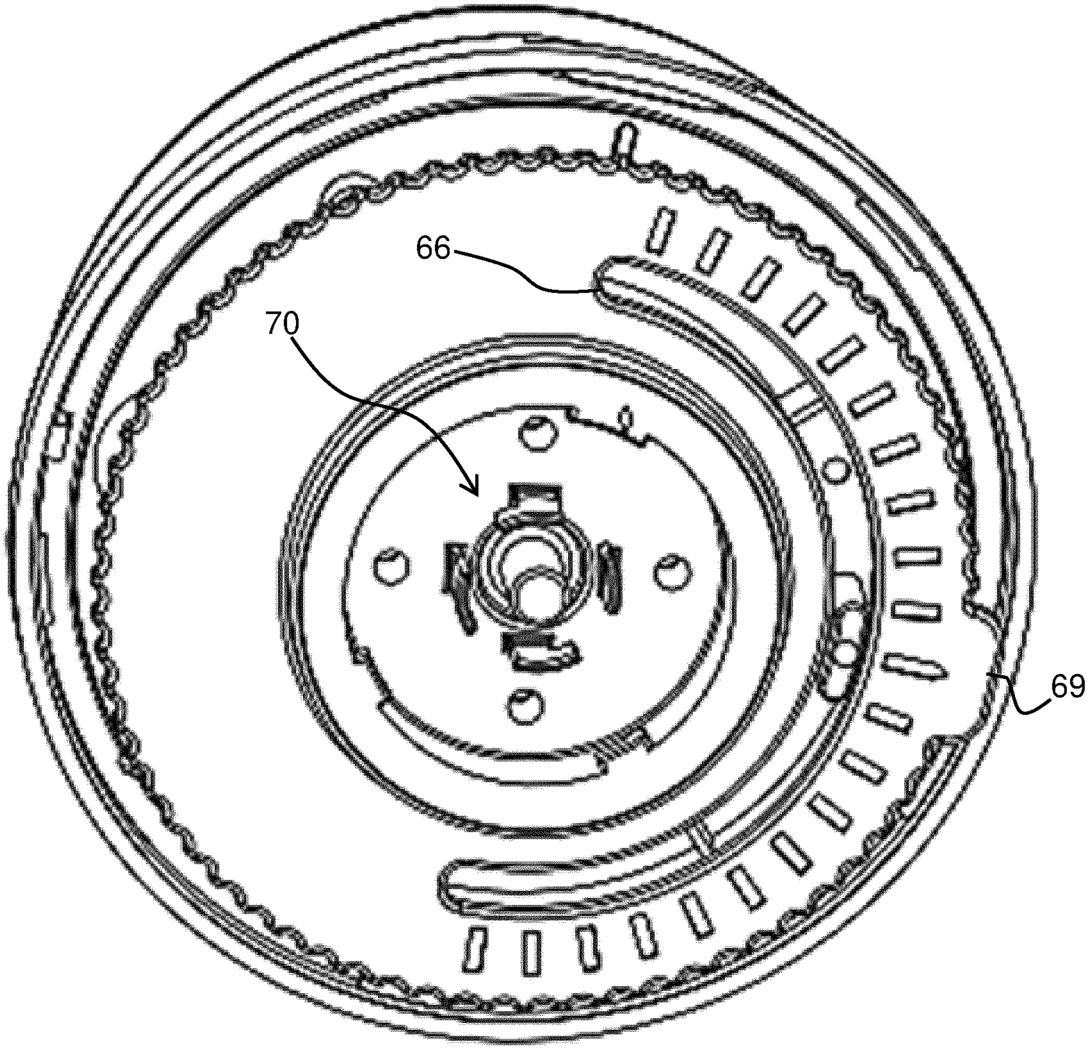
FIG. 10 shows a view from underneath the module.

FIG. 10 shows a view from underneath the module.

Figure 11:
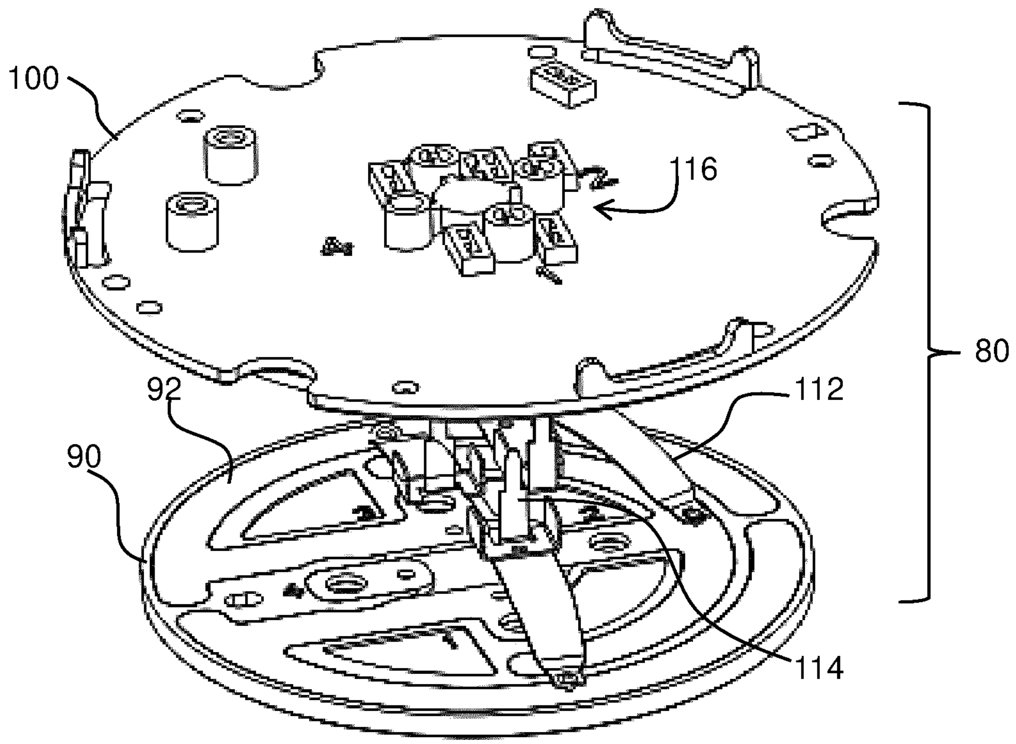
FIG. 11 shows the rotatable electrical connection in more detail in exploded perspective view.
Figure 12:
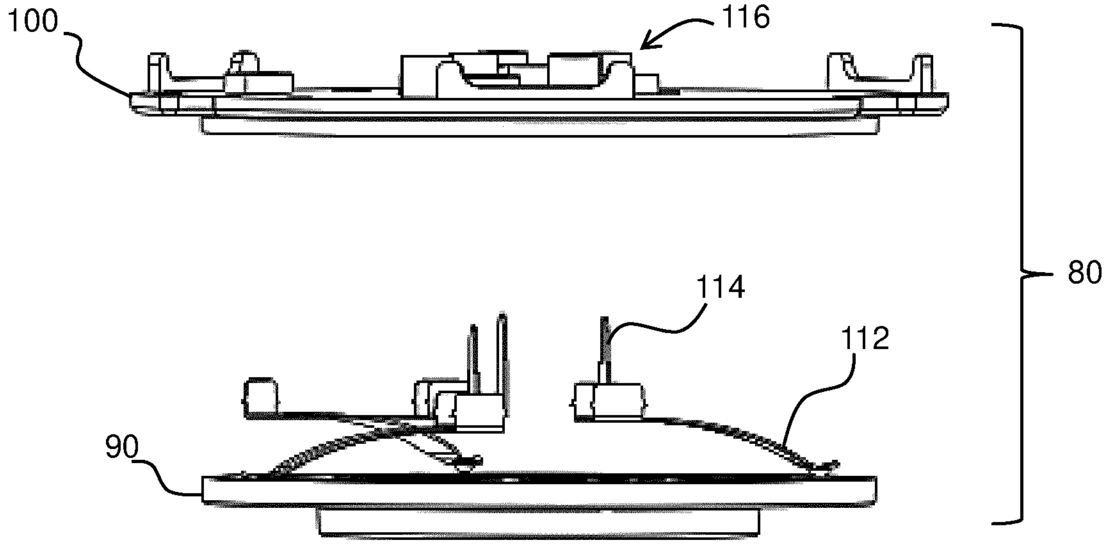
FIG. 12 shows the rotatable electrical connection in exploded side view.

FIG. 11 shows the rotatable electrical connection 80 in more detail in exploded perspective view. FIG. 12 shows the same parts in exploded side view.

Between the conductor track plate 90 and the spring contact plate 100 is a set of spring contact arms 112. Each arm 112 makes electrical connection between a terminal 114 of the spring contact plate 100 and a (copper) track 92 of the conductor track plate 90. The terminals 114 of the spring contact plate pass through openings 116 and then connect in a fixed manner to the electrical circuitry of the module. The terminals 114 are copper tails which can be soldered to the electrical circuitry. There may typically be three or four terminals and a corresponding number of spring terminals.

Figure 13:
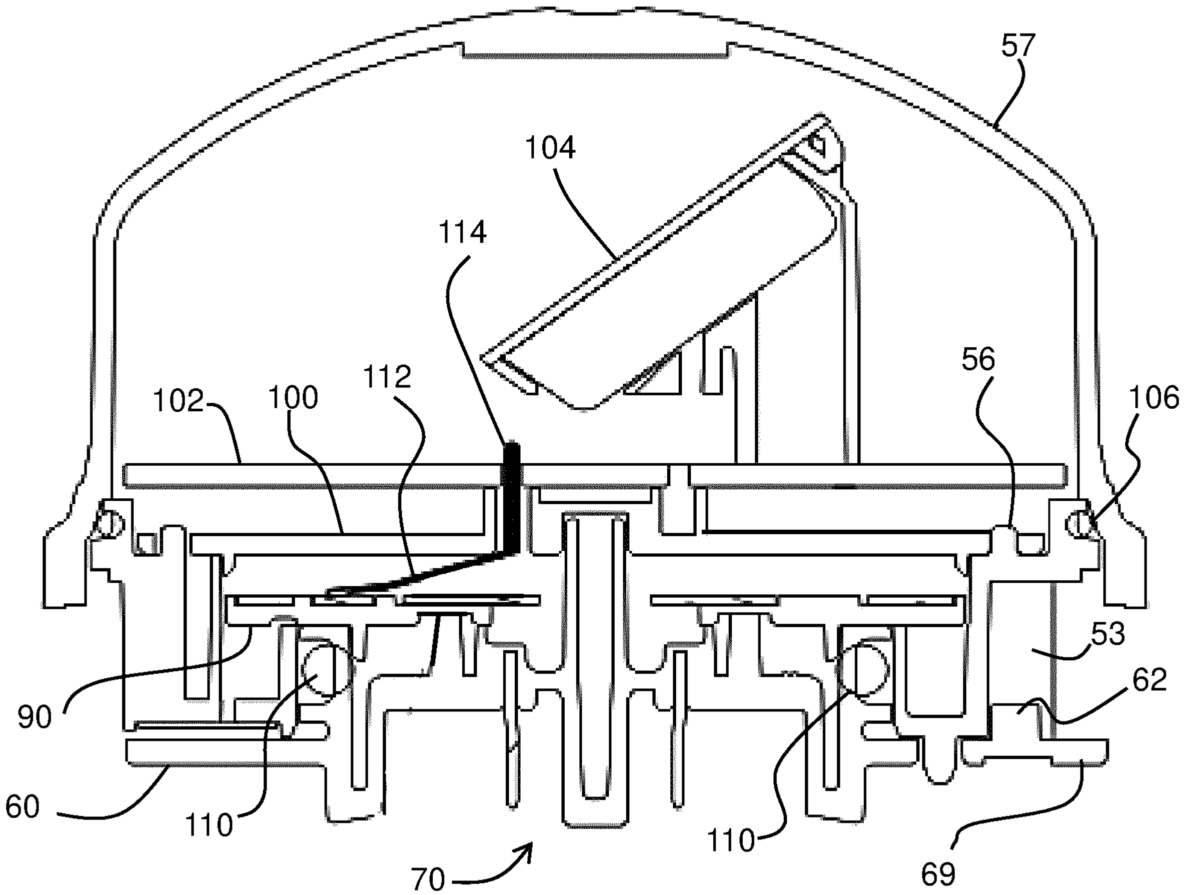
FIG. 13 shows a cross sectional view of the module locked into a rotational position.

FIG. 13 shows a cross sectional view of the module locked into a rotational position. The locking feature 62 is held by one of the receiving elements 53 (e.g. a space between a pair of teeth).

Figure 14:
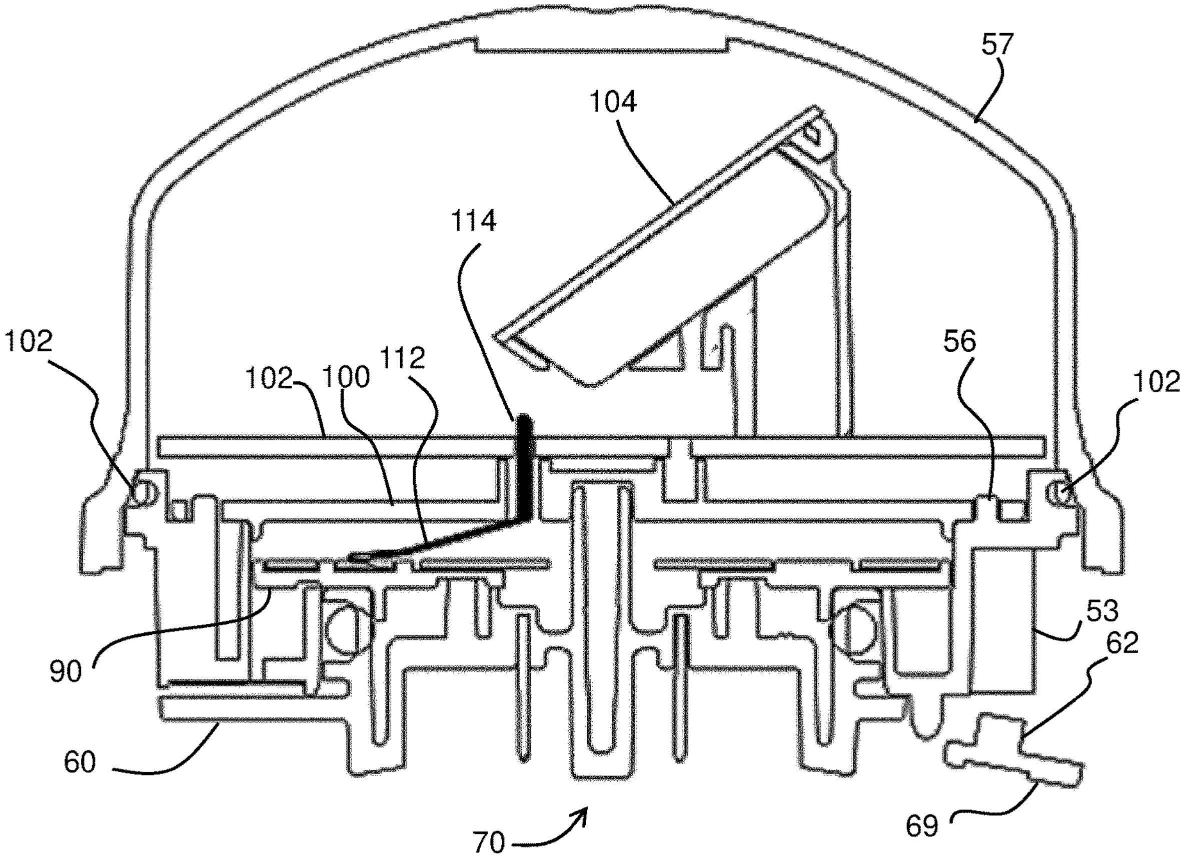
FIG. 14 shows a cross sectional view of the module with the deformable region displaced to unlock the rotate plate from the main module housing.

FIG. 14 shows a cross sectional view of the module with the deformable region displaced to unlock the rotate plate from the main module housing 56, 57.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A module adapted for fitting to a luminaire, comprising:

a main module housing;

a rotate plate coupled to the main module housing, and rotatable relative to the main module housing;

a connection interface for connecting the module to a corresponding connection interface of the luminaire, wherein the connection interface is connected to the rotate plate; and a rotatable electrical connection between the rotate plate and the main module housing, wherein the rotate plate comprises a locking feature which engages with a retaining feature of the main module housing to lock the rotate plate with a selected relative rotational position between the rotate plate and the main module housing, wherein the locking feature is provided on an elastically deformable region of the rotate plate such that the locking feature can be brought out of engagement from the retaining feature by manual deformation of the deformable region thereby to enable selection of the relative rotational position.

2. The module of claim 1, wherein the rotate plate comprises a disc having an arc slot and the main module housing comprises a marker pin which projects into the arc slot to indicate the selected relative rotational position.

3. The module of claim 2, wherein the engagement between the arc slot and the marker pin defines the limits of the relative rotational position.

4. The module of claim 2, wherein the deformable region is a region of the rotate plate which is located radially outside the arc slot.

5. The module of claim 4, wherein the region of the rotate plate comprises a set of openings along a circumferential direction, each opening representing a particular relative rotational position.

6. The module of claim 2, wherein the locking feature is located at a position of the deformable region corresponding to a middle of the arc slot along a circumferential direction.

7. The module of claim 1, wherein the rotate plate comprises a finger tab at the location of the locking feature.

8. The module of claim 1, wherein the locking feature comprises a projection extending from the rotate plate and the retaining feature comprises a plurality of receiving elements, wherein the projection can be received in a selected one of the receiving elements to lock the rotate plate to the main module housing.

9. The module of claim 1, wherein the main module housing comprises a base plate and a cover, wherein a seal is provided between the base plate and the rotate plate.

10. The module of claim 1, wherein the rotatable electrical connection comprises a conductor track plate rotationally fixed to one of the rotate plate and the main module housing, and a spring contact plate rotationally fixed to the other of the rotate plate and the main module housing.

11. The module of claim 10, wherein the conductor track plate comprises a set of arcuate conductor tracks and the spring contact plate comprises a corresponding set of spring contacts each for contacting a respective one of the arcuate conductor tracks.

12. The module of claim 1, comprising a wireless communications module in the main module housing.

13. The module of claim 1, comprising a presence sensor in the main module housing.

14. A luminaire comprising:

a luminaire housing, comprising a connection interface for connection to a module; and the module of claim 1 connected to the connection interface of the luminaire housing.

15. The luminaire of claim 14, comprising a street light luminaire.

* * * * *